(12) United States Patent
Manzone et al.

(10) Patent No.: US 7,585,129 B2
(45) Date of Patent: Sep. 8, 2009

(54) REFINEMENT OF THE DEVICE FOR ATTENUATING SEA SWELL IN THE FORM OF A SO-CALLED "CAMEL'S BACK"

(75) Inventors: Jean-Michel Manzone, Monaco (MC); David Lajoie, Le Tignet (FR)

(73) Assignee: Gouvernement Monegasque Represente Par Le Ministre D'Etat, Monaco (MC)

( * ) Notice: Subject to any disclaimer, the term of this patent is extended or adjusted under 35 U.S.C. 154(b) by 59 days.

(21) Appl. No.: 11/255,505

(22) Filed: Oct. 21, 2005

(65) Prior Publication Data

US 2006/0088381 A1    Apr. 27, 2006

(30) Foreign Application Priority Data

Oct. 21, 2004  (FR) ................... 04 11197
Oct. 21, 2004  (FR) ................... 04 11198

(51) Int. Cl.
  *E02B 3/06*    (2006.01)
(52) U.S. Cl. ............... 405/31; 405/21; 405/27; 405/30
(58) Field of Classification Search .......... 405/31, 405/30, 28, 27, 26, 21
   See application file for complete search history.

(56) References Cited

U.S. PATENT DOCUMENTS

| | | | |
|---|---|---|---|
| 3,846,988 A | 11/1974 | Lamy | 61/3 |
| 4,006,598 A | 2/1977 | Hulsemann | 405/25 |
| 4,279,536 A | 7/1981 | Jarlan | 405/31 |
| 4,836,709 A * | 6/1989 | Ploeg et al. | 405/31 |
| 4,850,742 A * | 7/1989 | Bouchet et al. | 405/26 |

FOREIGN PATENT DOCUMENTS

| | | | |
|---|---|---|---|
| DE | 26 03 419 A1 | | 8/1977 |
| EP | 381572 A1 * | | 8/1990 |
| FR | 1 289 872 A | | 4/1962 |
| FR | 2 176 288 A | | 10/1973 |
| FR | 2 681 621 A | | 3/1993 |
| GB | 904 514 A | | 8/1962 |
| GB | 1 457 183 A | | 12/1976 |
| JP | 63 093918 | | 4/1988 |
| JP | 63093918 | * | 4/1988 |
| JP | 02147710 | * | 6/1990 |
| WO | WO 02/48464 A | | 6/2002 |

* cited by examiner

*Primary Examiner*—David J Bagnell
*Assistant Examiner*—Sean D Andrish
(74) *Attorney, Agent, or Firm*—BainwoodHuang

(57) ABSTRACT

Swell attenuating device comprising a horizontal plate slightly immersed in the incident sea swell, this plate being held in position under the free surface of the water and presenting perpendicular upstream (12) and downstream (14) edges raised to a positive dimension above the free surface of the water, so that the incident sea swell cannot propagate freely over the plate, each of the upstream and downstream edges being extended at their base by a tab-shaped element (12A, 14A) of the same specific length, the assembly thus forming a symmetrically profiled structure in the form of a so-called "camel's back", device wherein one at least of the two elements formed by the perpendicular upstream edge and the plate part, or raft (10A), laid between the upstream and downstream edges comprises orifices (20) over part of its surface.

12 Claims, 11 Drawing Sheets

REFINEMENT OF THE DEVICE FOR ATTENUATING SEA SWELL IN THE FORM OF A SO-CALLED "CAMEL'S BACK"

CROSS REFERENCE TO RELATED APPLICATIONS

This Patent Application is a U.S. Utility Patent Application of French Patent Application No. 04 11197 filed on Oct. 21, 2004, and French Patent Application No. 04 11198 filed on Oct. 21, 2004, the contents and teachings of which are hereby incorporated by reference in their entirety.

BACKGROUND

The invention relates to the field of maritime hydraulics and more particularly it relates to a refinement of the device for attenuating sea swell in the form of a so-called "camel's back" described in European Patent EP 0 381 572 B1.

Devices for attenuating sea swell are well known. They enable any site, for example maritime structures, coastal or offshore installations or even ports, to be protected from the energy of the incident waves breaking against these sites.

The most popular devices rely on rock-filled slopes or concrete structures lying on the marine substrate, or a combination of the two, which rising from the sea-bed thus form a vertical obstacle for the incident waves.

Now, sea swell being an undulatory phenomenon, it appeared more advantageous to exploit this phenomenon in order to obtain a swell wave transmitted to the site to be protected, having an appreciably reduced amplitude compared to the wave from incident sea swell. It is the object of European Patent N° 0 282 479 B1, published in the name of the Monaco Government and disclosing a sea swell attenuator exploiting a particularly novel principal and known since under the name of "fixed wall of water". This device comprises a horizontal plate held slightly immersed in the incident sea swell, the upstream and downstream edges of which are raised to a positive dimension above the free surface of the water so that the incident sea swell cannot propagate freely above the plate. For suitable dimensioning of the plate, relative to the incident sea swells, the mass of water imprisoned beneath the plate can have only horizontal displacements and behaves overall like a homogeneous inert obstacle with respect to the incident sea swell, which swell is reflected on this "fixed wall of water".

This device, which is totally satisfactory for sea swells of short duration (less than 5 seconds), however for sea swells of longer duration generates a lapping effect, which acts unfavourably on the amplitude of the swell wave transmitted to the site to be protected. This is why, in European Patent N° 0 381 572 B1 mentioned above, also published in the name of the Monaco Government, a refinement of the sea swell attenuation device which makes it possible to avoid this lapping effect, has been proposed. A preferred example of a refined device of this kind is illustrated in FIGS. 6 to 8 of this European Patent, which shows a horizontal plate having a symmetrical profile in the form of a so-called "camel's back". This refined device, of which an embodiment is today operational in the port of Condamine in the Principality of Monaco, is totally satisfactory for a very wide range of swell durations. However it was apparent that, for sea swells of long duration (from 6 to 10 seconds), the horizontal and vertical hydrodynamic efforts and the moments of inversion acting on the device were significant. Their reduction would therefore be likely to minimize the dimensioning both of the structures of the attenuator as well as of its supports or connections.

SUMMARY OF THE INVENTION

The object of the invention is therefore to propose a refinement of the device for attenuating sea swell of the "camel's back" type, which enables the horizontal and vertical efforts as well as the moment of inversion to be minimized while preserving the attenuating effectiveness of the basic structure.

These objects are achieved by a sea swell attenuator comprising a horizontal plate slightly immersed in the incident sea swell, said plate being held in position under the free surface of the water and presenting perpendicular upstream and downstream edges raised to a dimension above the free surface of the water, so that the incident sea swell cannot propagate freely over said plate, each of said upstream and downstream edges being extended at their base by a tab-shaped element of the same specific length, the unit thus forming a symmetrically profiled structure in the form of a so-called "camel's back", characterized in that one at least of the two elements formed by said upstream perpendicular edge and the plate, or raft, laid between said upstream and downstream edges comprises orifices over part of its surface.

These orifices make a noticeable improvement to the operation of the attenuating device in the form of a "camel's back" by reducing the compressive forces acting on the device, in particular with respect to strong sea swells.

According to a first embodiment, said raft comprises orifices over at most 30% of its surface.

This piercing of the raft, in particular for sea swells of long duration, provides a significant reduction of the vertical forces generated under the plate by the wall of water and which would tend to try to lift this plate to allow the passage of the swell wave.

Said raft preferably comprises orifices over about 10% of its surface.

With this porosity of around 10%, a good compromise is obtained for a wide range of sea swell durations, that is to say a noticeable improvement in the vertical effort without visible deterioration of the attenuation.

According to a second embodiment, said perpendicular upstream edge under said free surface of the water comprises orifices over at most 50% of its surface.

This piercing of the upstream edge allows a notable reduction, in particular for sea swells of long duration, in the horizontal forces generated by the incident sea swell, notwithstanding the increase in the vertical effort.

Said perpendicular upstream edge under said free surface of the water preferably comprises orifices over about 30% of its surface.

With this porosity of around 30%, a good compromise is obtained for a wide range of durations of sea swell, that is to say a considerable reduction in the horizontal effort without too significant a deterioration in the vertical effort.

According to a preferred embodiment, said raft comprises orifices over about 10% of its surface and said perpendicular upstream edge under said free surface of the water comprises orifices over about 30% of its surface.

This particular distribution of the orifices in the upstream edge and the raft allows a notable reduction in the hydrodynamic efforts while not or almost not penalizing the swell attenuation performance of the device.

According to the embodiment considered, said horizontal plate can be held in position under said free surface of the water by means of rigid supports of the jacket or pile type anchored on the sea-bed or by means of stretched cables or rods anchored on the sea-bed.

BRIEF DESCRIPTION OF THE DRAWINGS

The features of this invention are detailed below, on a purely illustrative and non-restrictive basis, in the appended drawings wherein.

DETAILED DESCRIPTION OF EMBODIMENTS

Figure 8:
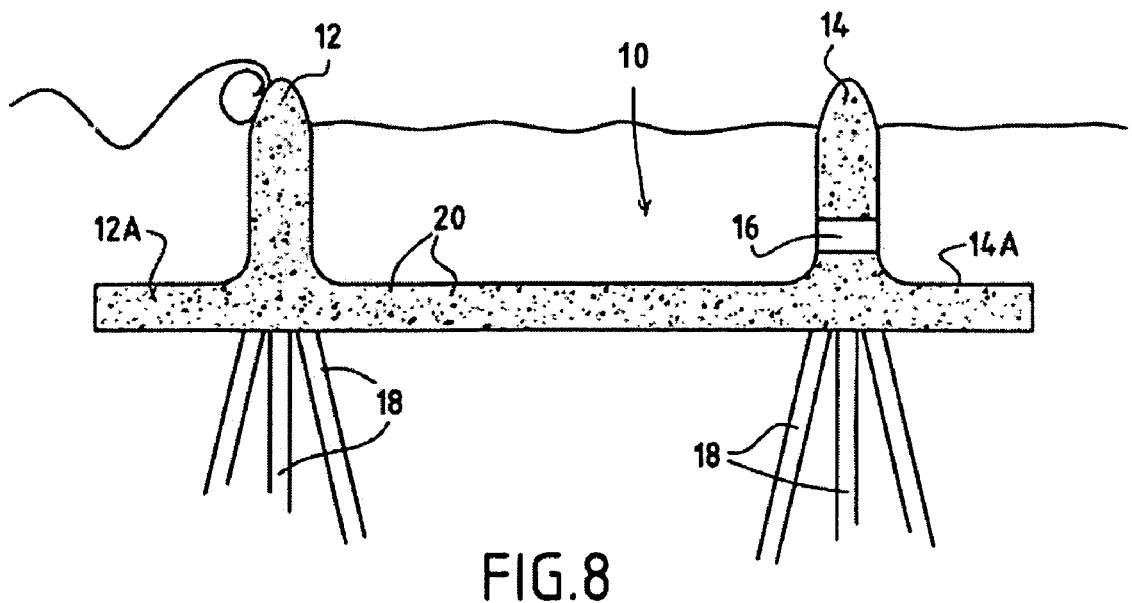
FIG. 8 shows a prior art swell attenuating device in the form of a "camel's back".

FIG. 8 firstly recalls the configuration in the form of a so-called "camel's back" of the sea swell attenuator described in European Patent N° 0 381 572 B1 of the applicant and to which the refinement of the invention applies.

This device comprises a slightly immersed horizontal plate 10 the upstream 12 and downstream 14 edges of which are raised perpendicularly to a positive dimension above the level of the free surface of the water. An upstream tab-shaped element or stub 12A is associated with the upstream edge and with the downstream edge a downstream tab-shaped element or stub 14A of the same shape as the upstream tab-shaped element. Owing to the very considerable length of this type of device (which for example is arranged along a coast to be protected), the volume of water present in the basin formed between the upstream and downstream edges, in the event of strong sea swell passing over the upstream edge, cannot be evacuated by the two single lateral ends of the device and it is thus necessary to envisage orifices 16 provided in the downstream edge to allow the water accumulated in the basin between two successive sea swells to drain away. The assembly forms a symmetrical profile with two humps similar to a camel's back. Depending on the embodiment considered, the plate may either be held fixed, under the surface of the water, by rigid supports 18 of the jacket or vertical or oblique pile type of sufficient diameter, firmly anchored on the sea-bed, or held floating, under the surface of the water, after being given positive buoyancy (by creating empty spaces in the plate so as to achieve a total weight less than the Archimedes' lift) and anchored on the sea-bed by stretched cables or rods.

Figure 1:
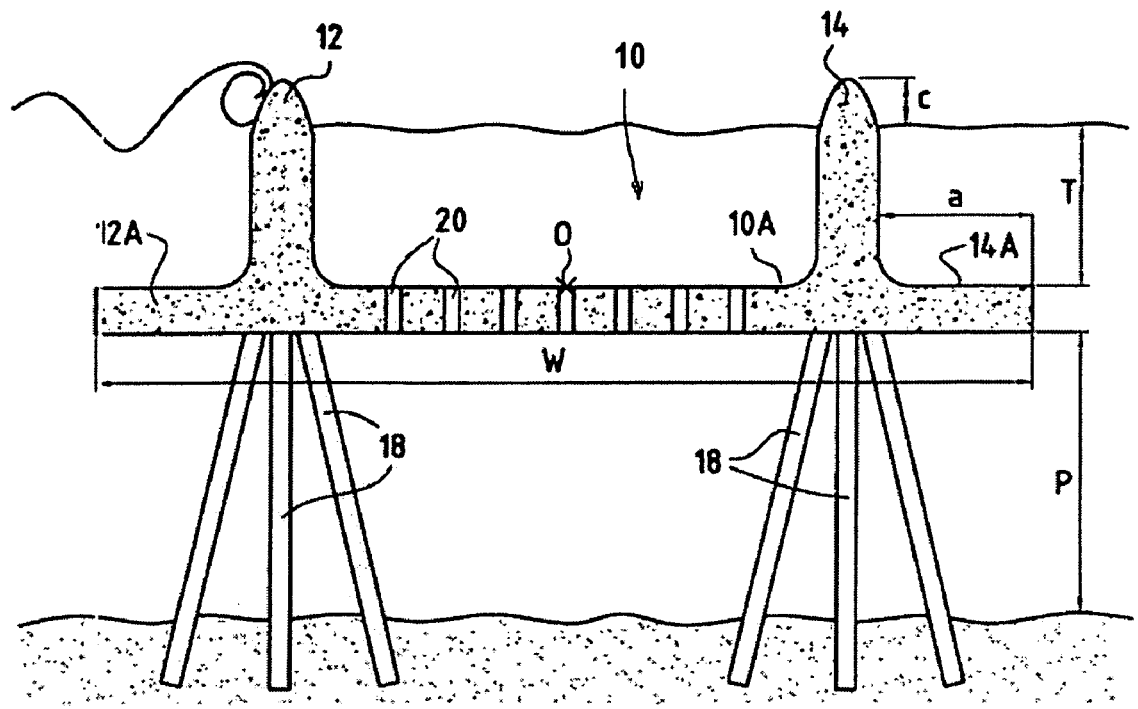
FIG. 1 illustrates a first embodiment of a swell attenuating device according to the invention.

According to a first embodiment of the invention illustrated in FIG. 1, applicable to one or other of the two above-mentioned modes of embodiment, but which finds application preferably when the sea swell attenuator is given positive buoyancy and held in position under the surface of the water by a system of stretched cables or rods anchored on the sea-bed, with the aim of limiting the vertical compressive forces acting on the device, orifices 20 are provided in the part 10A of the horizontal plate, known as a raft, arranged between the upstream edge and the downstream edge of the device. These small and numerous orifices are arranged over at most 30% of the surface of this raft (this rate of porosity is the ratio between the pierced surface and the support surface of the orifices). Moreover, the downstream edge is devoid of orifices, water drainage in the event of the upstream edge being passed over now being carried out through orifices 20.

The performance of the improved swell attenuator of the invention is illustrated in FIGS. 2A to 2D where four graphs have been reproduced, showing respectively the evolution of the transmission coefficient CT, the horizontal effort Fx, the vertical effort Fz and the moment of inversion My, for a range of sea swell durations ranging from 4 seconds to 14 seconds and for porosities of the raft of 10%, 20% and 30% respectively.

These curves were obtained on the basis of numerical calculations and corroborated by tests carried out in channelled sea swell with a 1/30 scale model of a swell attenuator having a width W of 30 m, a draught T of 9.50 m, a levelling dimension c of 2 m and a tab-shaped element breadth a of 5 m. The swell attenuator is assumed to be held fixed at a depth P of 80 m from the sea-bed. Coefficient CT was measured for a peak to hollow height of incident sea swell H of 2 m corresponding to the height of average sea swell in the Mediterranean basin. The efforts Fx and Fz and the moment of inversion My on the other hand were measured for a height of incident sea swell H of 10 m corresponding to a very exceptional storm swell of the centennial type.

Figure 2A:
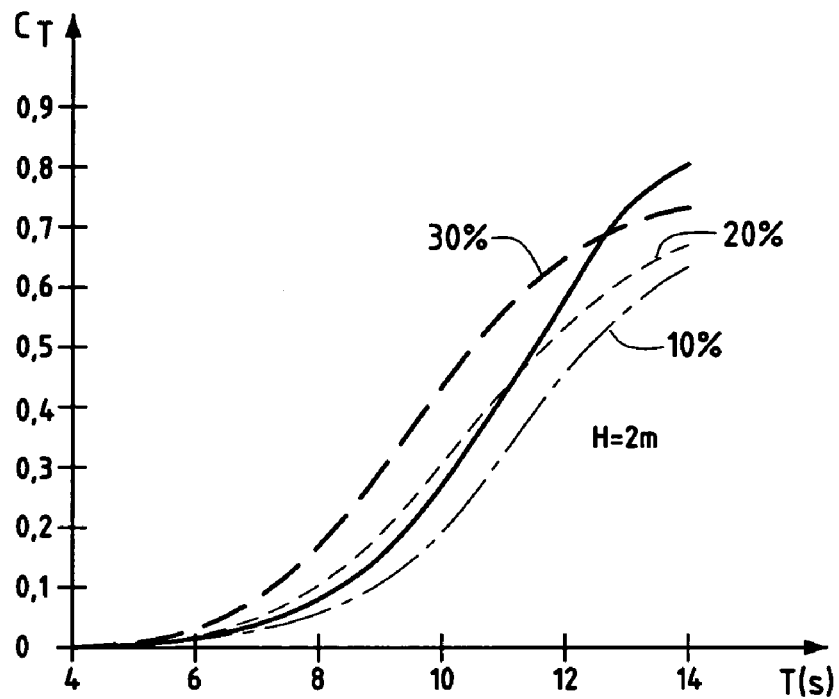
FIGS. 2A to 2D are four graphs showing the evolution respectively of the transmission coefficient CT, horizontal effort Fx, vertical effort Fz and moment of inversion My in the device of FIG. 1, for a range of sea swell durations ranging from 4 seconds to 14 seconds and for porosities of the raft of 10%, 20% and 30% respectively.

FIG. 2A enables the transmission coefficient CT of a swell attenuator in the form of a "camel's back" of the prior art illustrated by the curve as a solid line to be compared with an improved attenuator according to the invention for the different porosities mentioned above. In the prior art, the transmission coefficient is lower than 0.1, up to an 8 second duration then gradually increases up to 0.40 where T=10 seconds and reaches 0.70 for a 12 second duration. With the invention, it may be noted that for porosities of 10 and 20% this coefficient CT hardly changes during the short durations and improves in the long durations. Beyond these percentages, the attenuation starts to weaken in short durations, it being possible to estimate the limit of porosity at 30%.

Figure 2B:
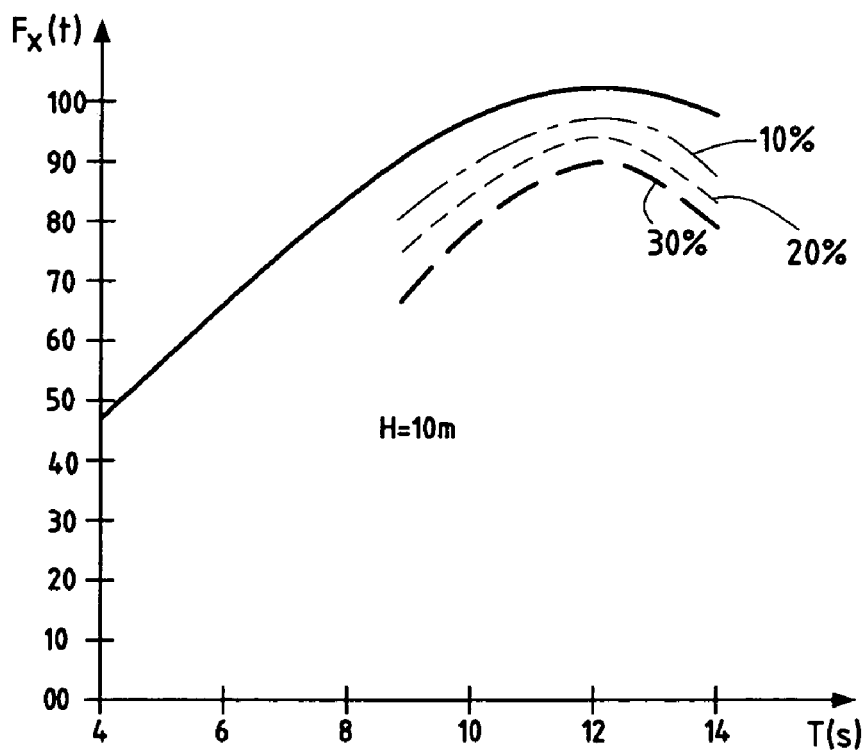
Figure 2C:
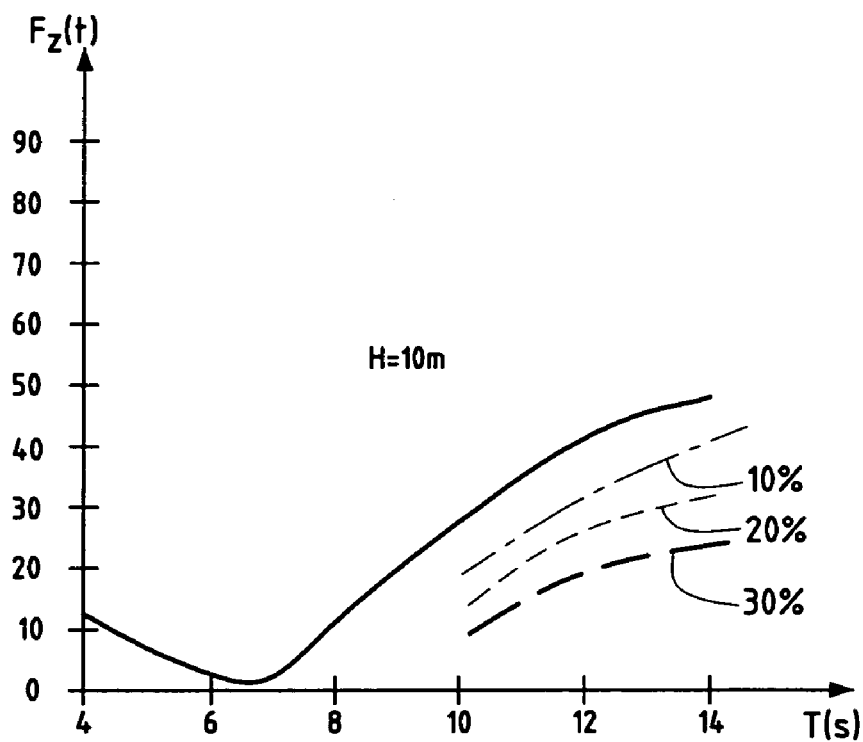

The horizontal efforts are compared in FIG. 2B and it may be noted that these hardly change. Even for a porosity of 30%, the horizontal effort Fx therefore reduces from 105 t per m to 90 t per m. On the other hand, the vertical efforts are greatly attenuated as shown in FIG. 2C. Thus, for the most extreme durations, for example T=12 seconds, the vertical effort Fz is divided by two, ranging from 50 t per m to 25 t per m with a porosity of 30%.

Figure 2D:
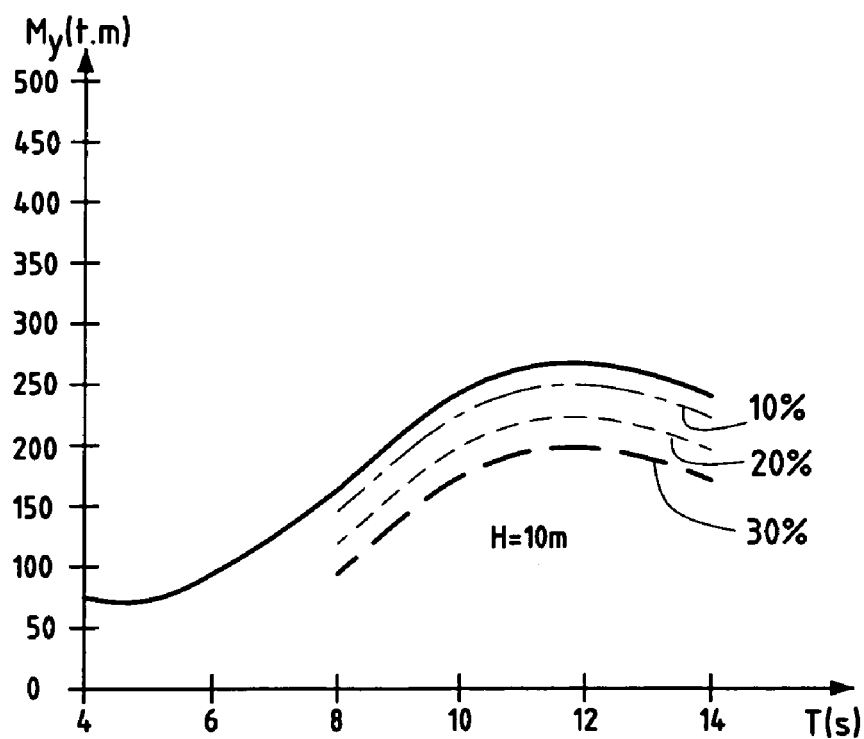

In FIG. 2D, it appears that the moment of inversion relative to the horizontal axis passing through O (point on the upper surface of the attenuator in the centre of the raft) is improved because of a reduction in the vertical effort and maintenance of the horizontal effort.

Generally, the piercing of the raft 10A produces porosities of 10 to 20%, even at most equal to 30%, in particular in the event of extreme storm, a significant reduction in the vertical effort as well as an improvement in the effectiveness of the attenuator for the corresponding durations. On the other hand, this effectiveness is slightly less for low sea swell amplitudes, that is to say for durations less than T=5 seconds. With a porosity of around 10% a good compromise is obtained for a wide range of sea swell durations, that is to say a noticeable improvement in the vertical effort without visible deterioration of the attenuation.

Figure 3:
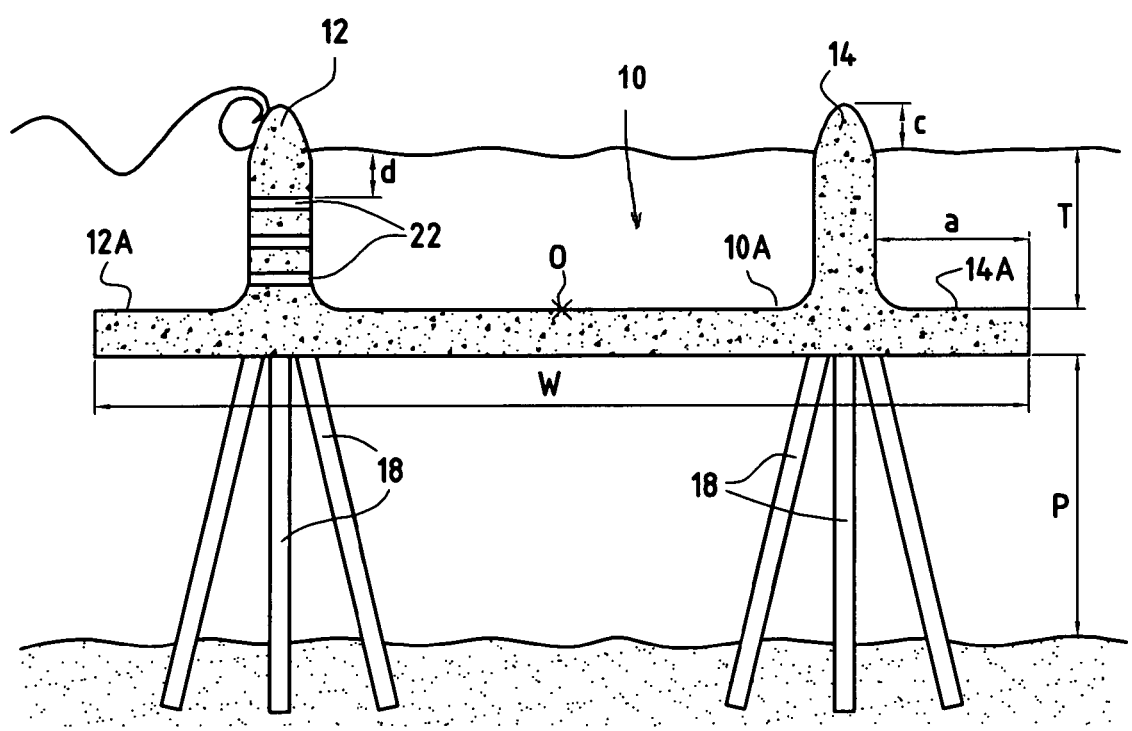
FIG. 3 illustrates a second embodiment of a swell attenuating device according to the invention.

A second embodiment of the invention is illustrated in FIG. 3. In this example, which preferably finds application, without being restrictive, when the swell attenuator is held fixed on rigid supports of the jacket or pile type anchored on the natural bottom of the sea, and with the aim of limiting the horizontal compressive forces acting on the device, orifices 22 are provided in the upstream edge 12 of the device over at most 50% of the surface of this upstream edge. Moreover, as previously the downstream edge is devoid of orifices, the water in the event of the upstream edge being passed over now being drained through orifices 22 during the backflow of the waves between two successive sea swells. Thus the basin formed between the upstream and downstream edges is allowed to empty rapidly by avoiding the formation of a residual water mattress. The performance of the corresponding swell attenuator is illustrated in FIGS. 4A to 4D which as previously reproduce four graphs, showing respectively the evolution of the transmission coefficient CT, the horizontal effort Fx, the vertical effort Fz and the moment of inversion My, for a range of sea swell durations ranging from 4 seconds to 14 seconds and for porosities of the upstream edge of 10%, 20% and 30% respectively. The test conditions are the same as before, the orifices being provided starting from dimension d=−4 m under the level of the free surface of the water.

Figure 4A:
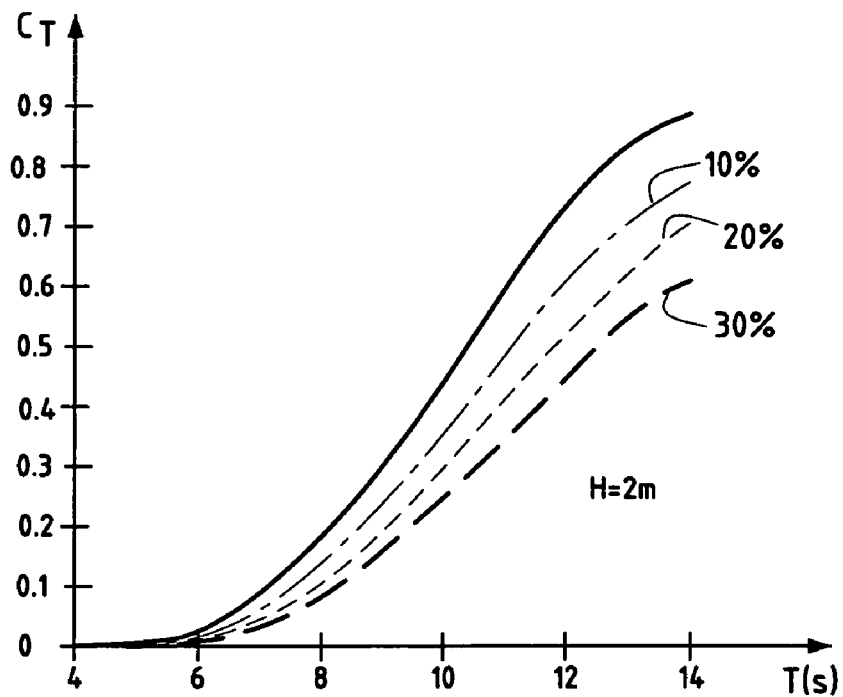
FIGS. 4A to 4D are four graphs showing the evolution respectively of the transmission coefficient CT, horizontal effort Fx, vertical effort Fz and moment of inversion My in the device of FIG. 3, for a range of sea swell durations ranging from 4 seconds to 14 seconds and for porosities of the upstream edge of 10%, 20% and 30%.

FIG. 4A enables the transmission coefficient CT of a swell attenuator in the form of a "camel's back" of the prior art, illustrated by the curve as a solid line, to be compared with an improved swell attenuator according to the second embodiment of the invention for these three different porosities. A great improvement in the effectiveness of the attenuator may be noted, particularly for the long durations (10 to 14 seconds). Thus, for a duration T of 10 seconds, CT goes from 0.40 to 0.25 for a porosity of 30%.

Figure 4B:
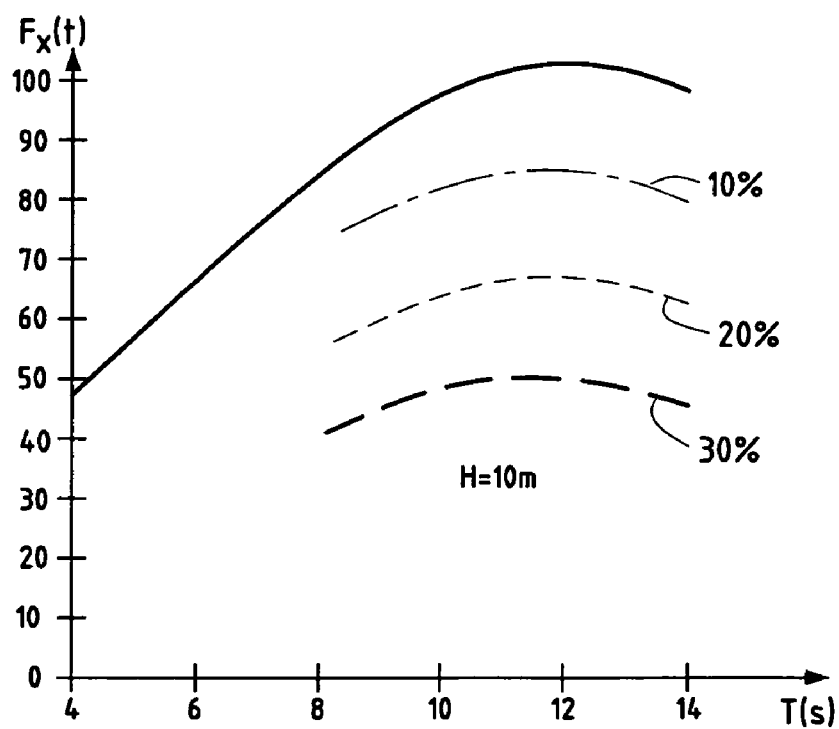
Figure 4C:
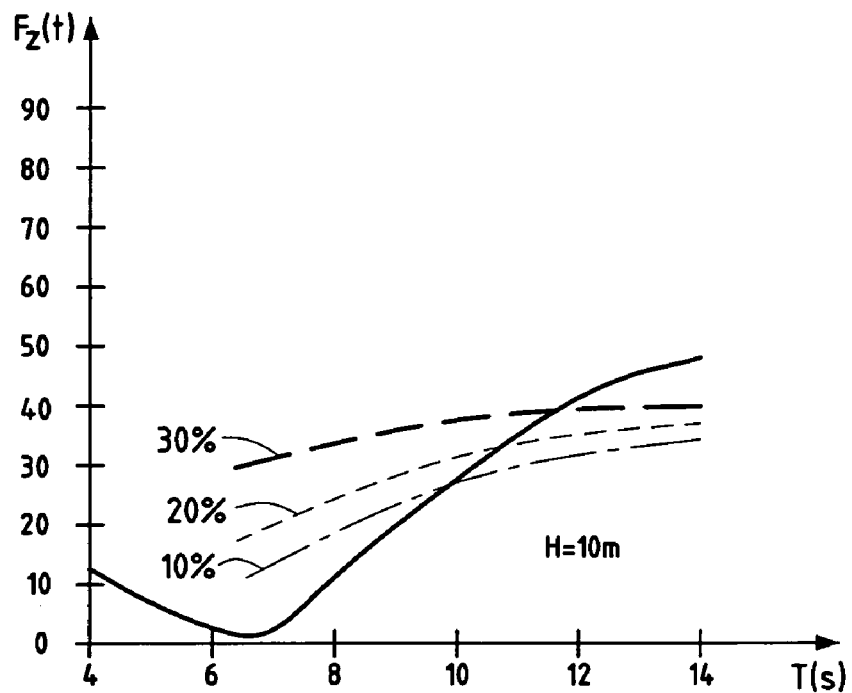
Figure 4D:
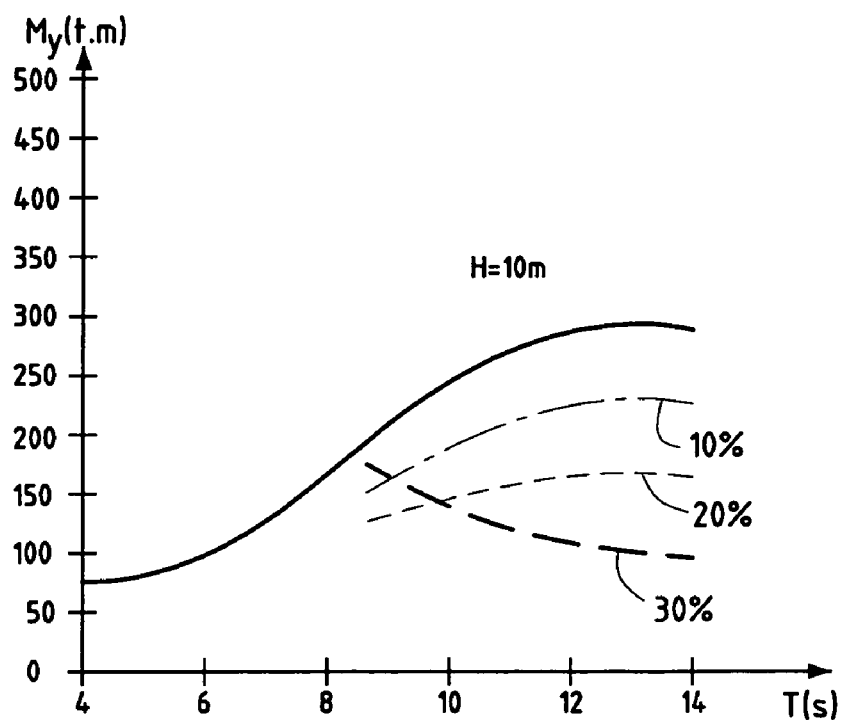

In the same way, the horizontal effort illustrated by FIG. 4B is largely reduced as the porosity increases. Thus it may be noted that for a porosity of 30%, the maximum horizontal effort Fx therefore reduces from 105 t per m to 50 t per m. On the other hand, the vertical effort strongly increases, as shown in FIG. 4C, particularly for durations of less than T=12 seconds with a porosity of 30%.

In FIG. 4D, it appears once again that the moment of inversion relative to the horizontal axis passing through O (point on the upper surface of the swell attenuator in the centre of the raft) is improved because of the reduction in the horizontal effort, notwithstanding the increase in the vertical effort.

Generally, the piercing of upstream edge 12 is beneficial to the overall operation of the attenuator. However, the increase in the vertical efforts must be precisely controlled. It will be also noted that it could be found that by heavily piercing the upstream edge (in particular with a porosity greater than 50%) the structure of the swell attenuator became almost asymmetrical, the latter then behaving like a horizontal plate with a single downstream edge, and thus rendering its behaviour with respect to hydrodynamic efforts relatively unfavourable.

Figure 5A:
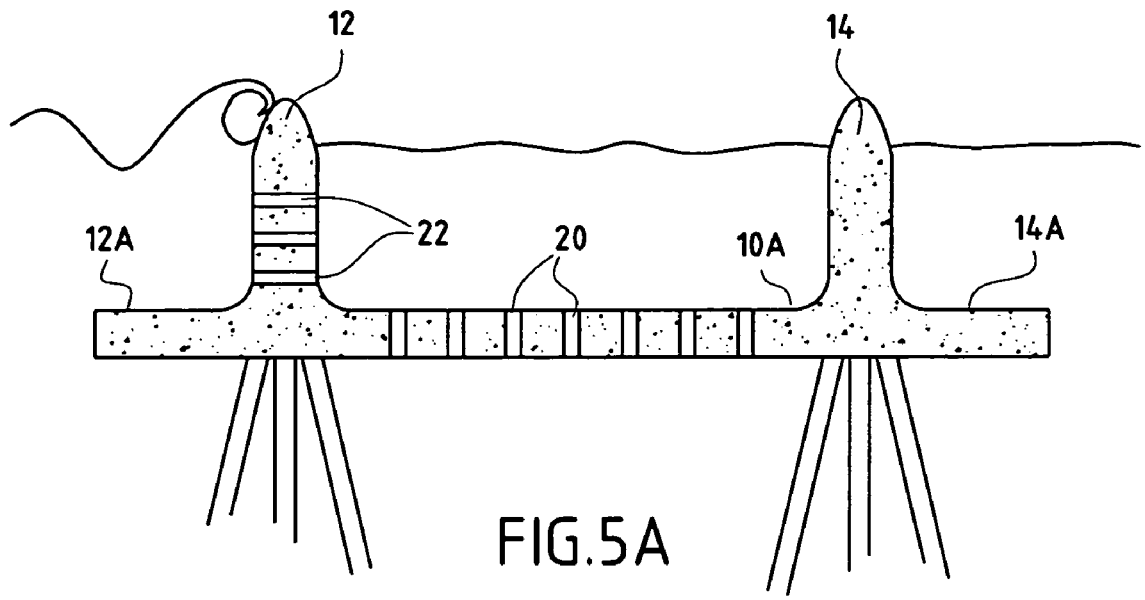
FIG. 5A illustrates a third embodiment of a swell attenuating device according to the invention, when the latter rests on rigid supports of the jacket or pile type.

A third embodiment of the invention is illustrated in FIG. 5A. In this embodiment, and with the aim of limiting both the vertical forces and the horizontal compressive forces acting on the device, orifices 20 are provided in the part 10A of the horizontal plate, known as the raft, arranged between the upstream edge and the downstream edge of the device and orifices 22 are provided in the upstream edge 12 of the device. These orifices are arranged over at most 30% of the raft surface like that of the upstream edge. Moreover, as previously the downstream edge is devoid of orifices, the water in the event of the upstream edge being passed over now being drained through orifices 20 or 22.

The performance of the corresponding attenuator is illustrated in FIGS. 6A to 6D where the four graphs were reproduced, showing respectively the evolution of the transmission coefficient CT, the horizontal effort Fx, the vertical effort Fz and the moment of inversion My, for sea swell durations ranging from 4 seconds to 14 seconds and for identical porosities of the raft and upstream edge of 10%, 20% and 30% respectively. The test conditions are the same as previously, the orifices in the upstream edge also being provided starting from a dimension of −4 m under the level of the free surface of the water.

FIG. 6A once again enables the transmission coefficient CT of a swell attenuator in the form of a "camel's back" of the prior art illustrated by the curve as a solid line to be compared with an improved attenuator according to the third embodiment of the invention for the three aforementioned porosities. It may be noted that the effectiveness of the swell attenuator approaches that obtained by piercing the raft alone.

Figure 6A:
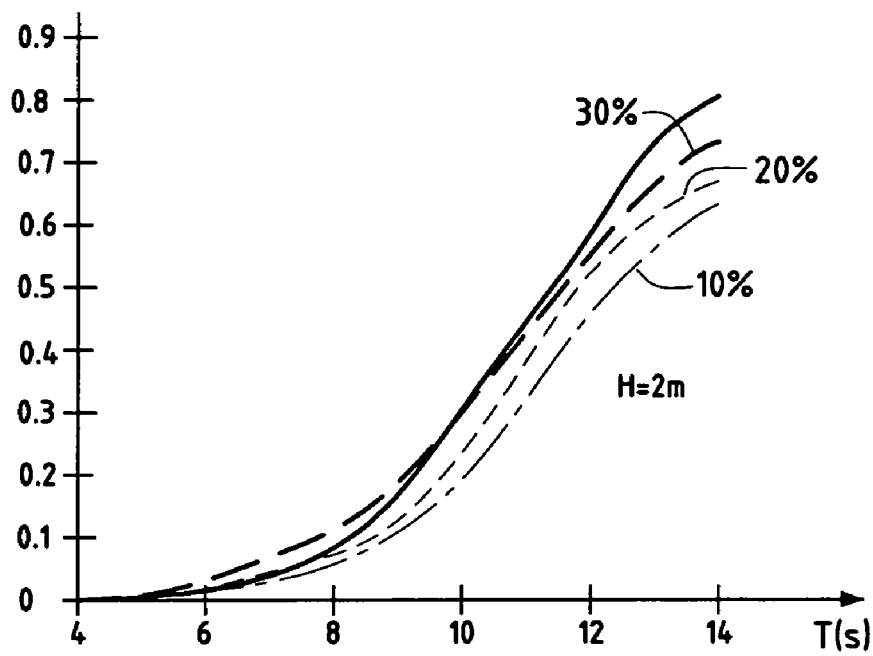
FIGS. 6A to 6D are four graphs showing the evolution respectively of the transmission coefficient CT, horizontal effort Fx, vertical effort Fz and moment of inversion My in the device of FIG. 5A, for a range of sea swell durations ranging from 4 seconds to 14 seconds and for porosities of the raft and upstream edge of 10%, 20% and 30%.
Figure 6B:
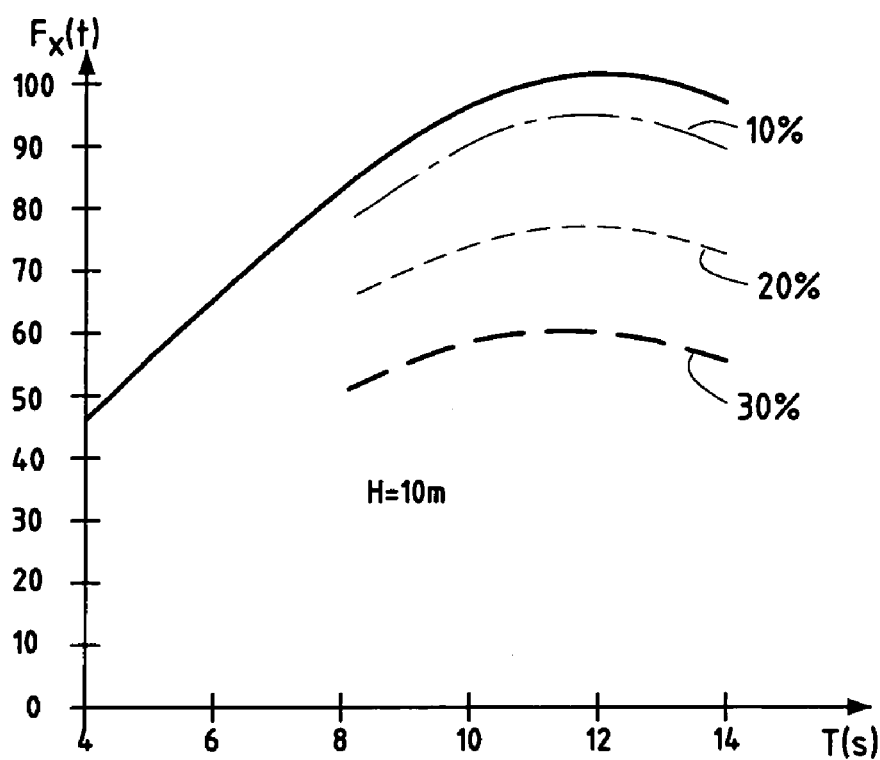
Figure 6C:
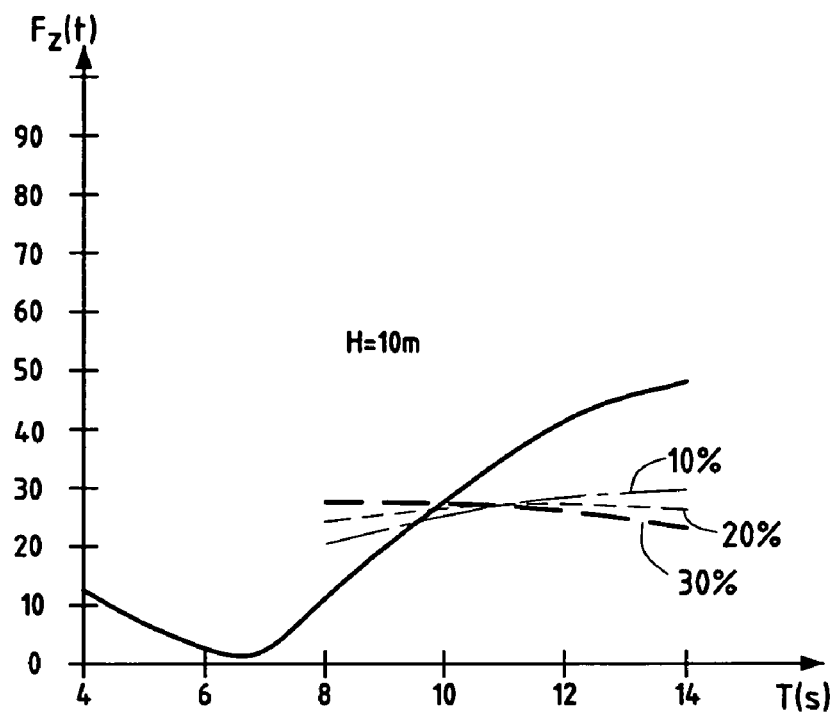
Figure 6D:
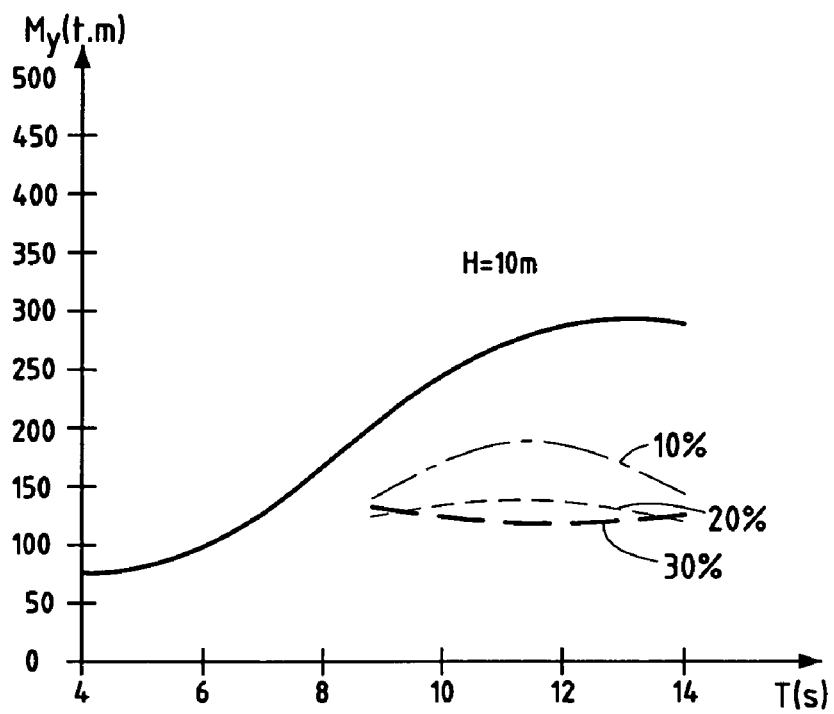

On the other hand, as in the case of the upstream edge being pierced, the horizontal effort illustrated by FIG. 6B is largely reduced as the porosity increases. Thus it may be noted that for a porosity of 30%, the maximum horizontal effort Fx therefore goes from 105 t per m to 60 t per m. But especially, the vertical effort is also reduced, as shown in FIG. 6C, reducing for example from 40 t per m to 25 t per m for a duration T of 12 seconds with a porosity of 30%.

The moment of inversion relative to the horizontal axis passing through O (point on the upper surface of the swell attenuator in the centre of the raft) hardly changes relative to the configuration in FIG. 3 (only upstream edge being pierced).

Figure 5B:
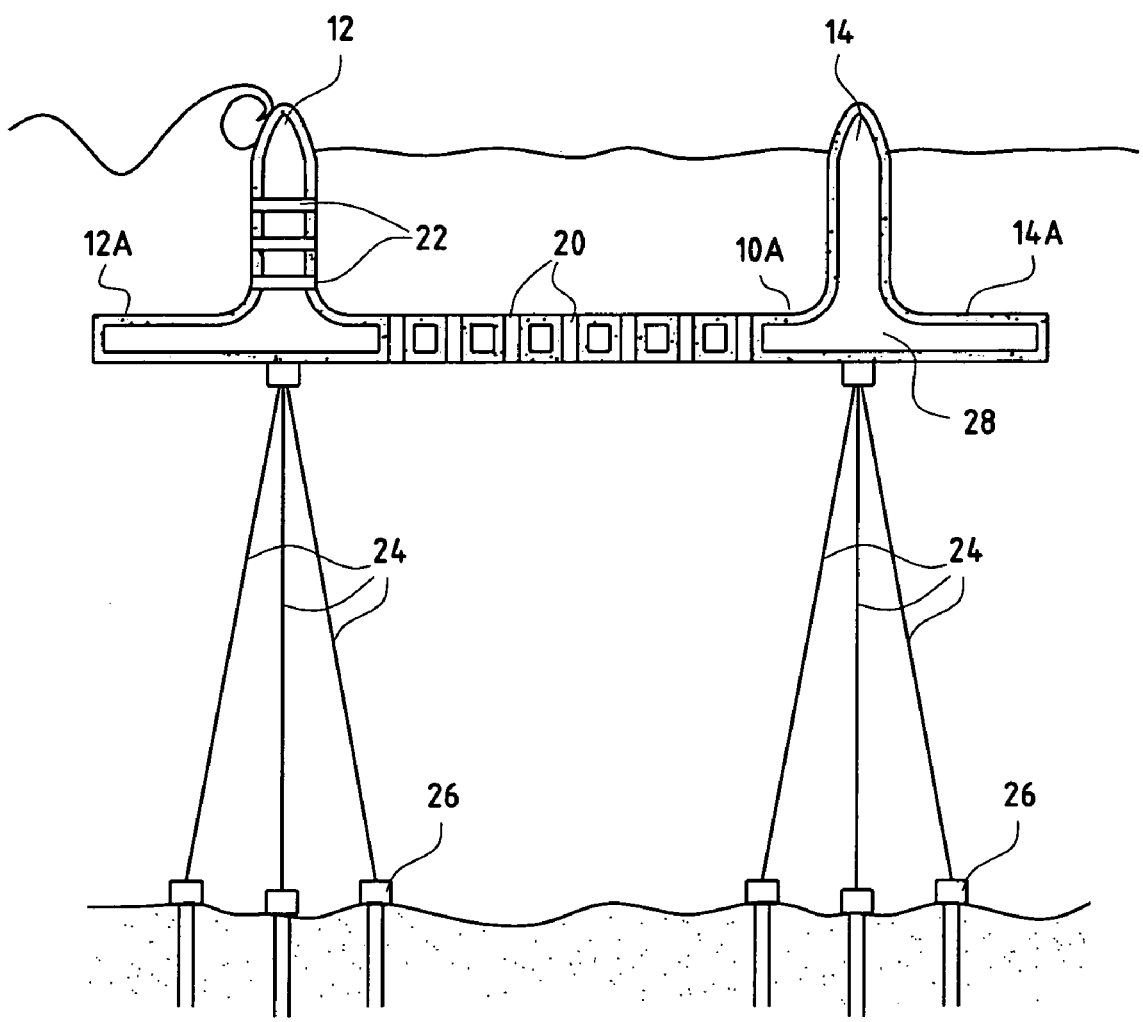
FIG. 5B illustrates a variant of the third embodiment of a swell attenuating device according to the invention when this, given positive buoyancy, is held in position by stretched cables or rods anchored to the sea-bed.

Generally, the combined piercing of the raft 10A and the upstream edge 12 is even more beneficial to the overall operation of the swell attenuator since both the horizontal effort and the vertical effort are reduced whereas the attenuation changes very little. Complementary tests moreover showed that, to obtain a noticeable improvement in both the horizontal effort and in the vertical effort without visible deterioration of the attenuation for a wide range of sea swells, it is not essential that the porosity of the raft and the upstream edge be identical and that a porosity around 10% (±5%) on the raft and around 30% (±10%) on the upstream edge ensures the best compromise for the ratio between effectiveness of attenuation and hydrodynamic efforts. This last configuration is especially advantageous when the attenuator is given positive buoyancy and is held under the surface of the water by a system of stretched cables or rods anchored to the sea-bed, as illustrated in FIG. 5B, which shows a horizontal plate provided with upstream and downstream edges 12, 14 and retained by cables 24 anchored to the sea-bed by means of anchoring 26. This horizontal plate comprises various empty spaces, for example that referenced 28, arranged so that its total weight is less than or equal to the Archimedes' lift in order to give it positive buoyancy.

The graphs in FIGS. 7A to 7D also illustrate an optimum configuration of this kind (reference "am" in the drawings) which is compared both with a prior art swell attenuator (curves as solid lines) and with an inverted configuration (reference "av" in the drawings) in which it is the downstream edge which is pierced with a porosity of 30%, the raft keeping its porosity of 10%. This comparison makes it possible to note that the function of the orifices in the upstream edge is completely different to that of the orifices in the downstream edge.

Figure 7A:
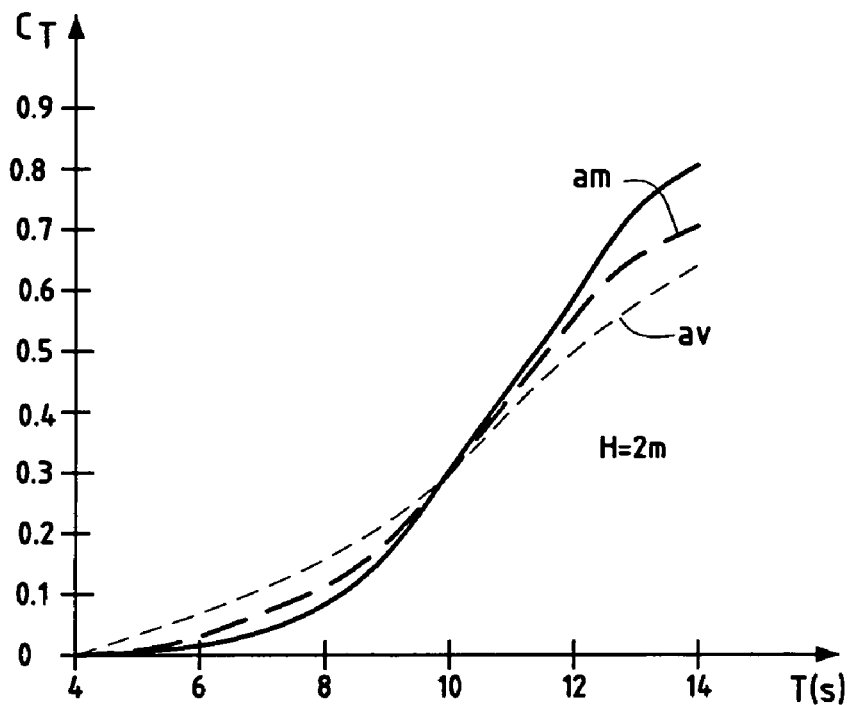
FIGS. 7A to 7D are four graphs showing the evolution respectively of the transmission coefficient CT, horizontal effort Fx, vertical effort Fz and moment of inversion My in the device of FIG. 5B and in a device provided with orifices on the downstream edge, for a range of sea swell durations ranging from 4 seconds to 14 seconds and for porosities of the upstream and downstream edges of 30%.
Figure 7B:
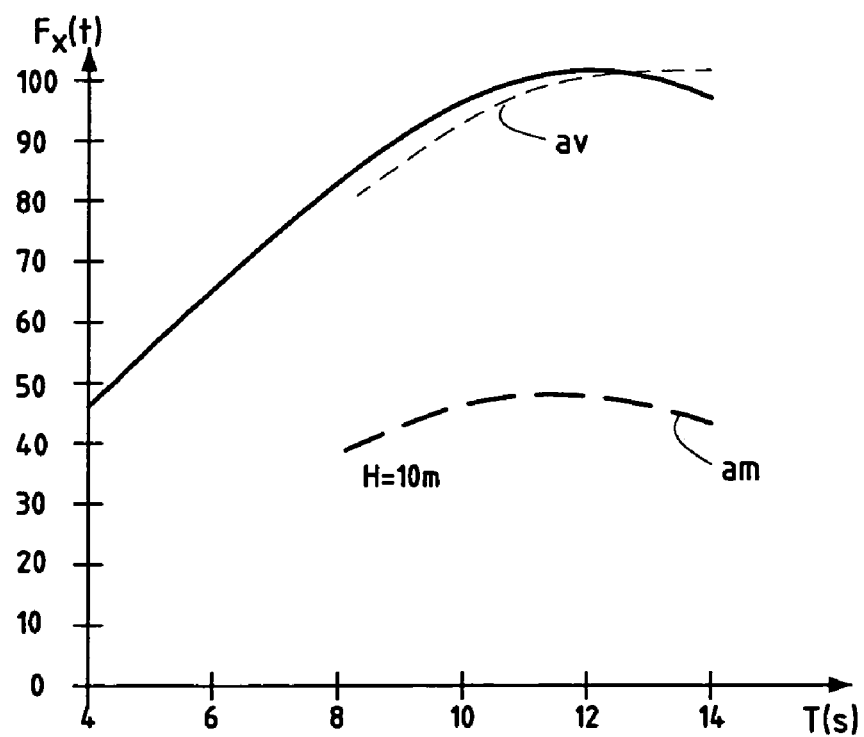
Figure 7C:
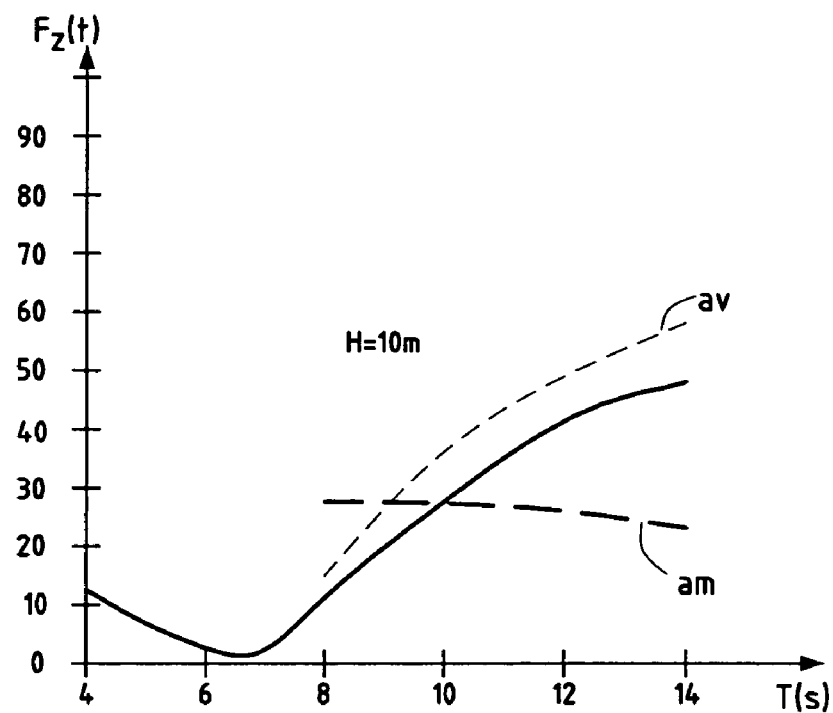
Figure 7D:
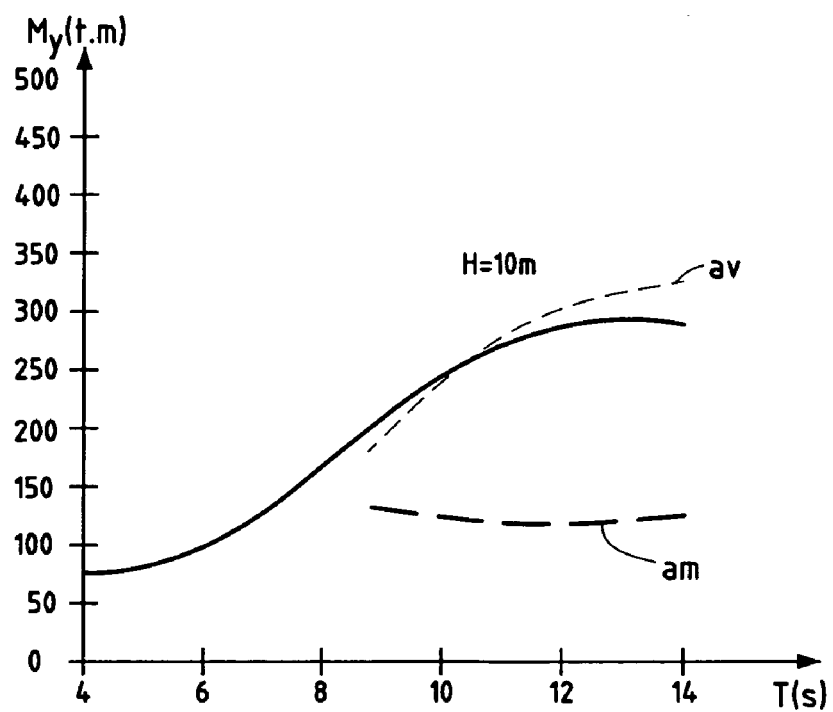

Indeed, if the effect on the attenuation of the device (FIG. 7A) is not very different according to whether the orifices are provided on the upstream edge or the downstream edge, particularly for durations of low or intermediate sea swell, it may be noted on FIGS. 7B and 7C that the piercing of the upstream edge (associated with that of the raft) greatly contributes to the reduction in the horizontal and vertical efforts, whereas that of the downstream edge has practically no effect on these efforts, but even increases them very slightly particularly for periods of high sea swell. It is the same for the moment of inversion, which is improved by piercing the upstream edge whereas it is very slightly reduced as a result of piercing the downstream edge.

It will be noted that the orifices of the invention are also distinct from those provided in the devices of prior art, in particular those of the caisson type, the essential purpose of which, when they are provided in the downstream wall of these devices, is to generate a delay between the incident wave absorbed by the caisson and the wave restored out of the caisson and, when they are arranged on a horizontal partition of these caissons, to create a damping of the oscillation movement of the water in the caisson to cause loss of energy. In these two cases, a loss in pressure is created in the orifices to provide damping or a barrier to the propagation of the oscillations.

On the other hand, by means of the invention, the piercing on part of their surface of at least one of the two elements formed by the perpendicular upstream edge and the plate part laid between the upstream and downstream edges (raft) aims to create a notable limitation of the vertical and horizontal compressive forces acting on the attenuator to enable the dimensioning both of the structures of this attenuator and of its supports or its connections to be minimized.

The invention claimed is:

1. Swell attenuating device comprising a horizontal plate slightly immersed in an incident sea swell to protect a natural or man-made structure from said incident sea swell, said plate being held in position under a free surface of the water and presenting perpendicular hump-shaped upstream and downstream edges raised to a positive dimension above said free surface of the water, so that the incident sea swell cannot propagate freely over said plate, the downstream edge facing toward the natural or man-made structure and the upstream edge facing away from the natural or man-made structure, each of said upstream and downstream edges being extended at their base by a respective upstream-facing and downstream-facing tab-shaped element of the same specific length, thus forming a symmetrically profiled structure in the form of a so-called "camel's hump", characterized in that (1) a raft between said upstream and downstream edges comprises orifices extending therethrough to reduce vertical compressing forces generated by a mass of water disposed under said horizontal plate, and (2) the perpendicular upstream edge under said free surface of the water comprises orifices extending therethrough over at most 50% of a surface to reduce horizontal compressing forces acting on the device.

2. Swell attenuating device according to claim 1, characterized in that the orifices of said raft cover up to 20% of the surface of the raft.

3. Swell attenuating device according to claim 2, characterized in that the orifices of said raft cover about 10% of the surface of the raft.

4. Swell attenuating device according to claim 3, characterized in that the orifices of said raft cover 5% to 15% of the surface of the raft.

5. Swell attenuating device according to claim 1, characterized in that the orifices of said perpendicular upstream edge under said free surface of the water cover about 30% of the surface of the perpendicular upstream edge under said free surface of the water.

6. Swell attenuating device according to claim 5, characterized in that the orifices of said perpendicular upstream edge under said free surface of the water cover 20% to 40% of the surface of the perpendicular upstream edge under said free surface of the water.

7. Swell attenuating device according to claim 1, characterized in that the orifices of said raft cover about 10% of the surface of the raft and the orifices of said perpendicular upstream edge under said free surface of the water cover about 30% of the surface of the perpendicular upstream edge under said free surface of the water.

8. Swell attenuating device according to claim 1, characterized in that said plate is held in position under said free surface of the water by means of rigid supports of the jacket or pile type anchored on the sea-bed.

9. Swell attenuating device according to claim 1, characterized in that said plate is given positive buoyancy and held in position under said free surface of the water by means of stretched cables or rods anchored on the sea-bed.

10. Swell attenuating device according to claim 1, characterized in that the orifices of said raft cover 5% to 15% of the surface of the raft and the orifices of said perpendicular upstream edge under said free surface of the water cover 20% to 40% of the surface of the perpendicular upstream edge under said free surface of the water.

11. Swell attenuating device according to claim 10, characterized in that said plate is given positive buoyancy and held in position under said free surface of the water by means of stretched cables or rods anchored on the sea-bed.

12. Swell attenuating device according to claim 10, characterized in that said plate is held in position under said free surface of the water by means of rigid supports of the jacket or pile type anchored on the sea-bed.

* * * * *